(12) United States Patent
Huang et al.

(10) Patent No.: US 8,599,737 B2
(45) Date of Patent: Dec. 3, 2013

(54) METHODS FOR COORDINATING TRANSMISSION AND RECEPTION OPERATIONS OF RADIO MODULES IN A COMMUNICATIONS APPARATUS AND COMMUNICATION APPARATUSES UTILIZING THE SAME

(75) Inventors: Shun-Yong Huang, Taipei (TW); Li-Chun Ko, Taipei (TW); Chia-Ming Chang, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 705 days.

(21) Appl. No.: 12/753,195

(22) Filed: Apr. 2, 2010

(65) Prior Publication Data
US 2011/0243046 A1 Oct. 6, 2011

(51) Int. Cl.
*H04B 7/14* (2006.01)
*H04J 3/00* (2006.01)

(52) U.S. Cl.
USPC .......................................... 370/315; 370/336

(58) Field of Classification Search
USPC .......................................... 370/327, 336–338
See application file for complete search history.

(56) References Cited

U.S. PATENT DOCUMENTS

| | | | | |
|---|---|---|---|---|
| 6,741,836 B2* | 5/2004 | Lee et al. | ...................... | 455/41.2 |
| 7,539,140 B2* | 5/2009 | Rodrigo et al. | ................ | 370/235 |
| 7,643,463 B1* | 1/2010 | Linsky et al. | .................. | 370/344 |
| 8,055,230 B1* | 11/2011 | Bidichandani et al. | .... | 455/232.1 |
| 2002/0173272 A1* | 11/2002 | Liang et al. | ...................... | 455/63 |
| 2003/0210658 A1* | 11/2003 | Hernandez et al. | ........... | 370/311 |
| 2005/0047358 A1* | 3/2005 | Pattabiraman et al. | ....... | 370/311 |
| 2005/0099979 A1* | 5/2005 | Chandra | ........................ | 370/338 |
| 2006/0030302 A1* | 2/2006 | Andrew et al. | ............. | 455/414.1 |
| 2007/0044160 A1* | 2/2007 | Ishibashi | .......................... | 726/34 |
| 2007/0066222 A1* | 3/2007 | Tao et al. | ...................... | 455/41.2 |
| 2007/0133457 A1* | 6/2007 | Doi et al. | ....................... | 370/329 |
| 2008/0056169 A1* | 3/2008 | Pattabiraman et al. | ....... | 370/311 |
| 2008/0130603 A1* | 6/2008 | Wentink et al. | ................ | 370/338 |
| 2008/0253352 A1* | 10/2008 | Thoukydides et al. | ....... | 370/345 |
| 2009/0111383 A1* | 4/2009 | Eckert et al. | .............. | 455/67.11 |
| 2009/0310618 A1* | 12/2009 | Carter | ........................... | 370/449 |
| 2010/0020773 A1* | 1/2010 | Jechoux | ........................ | 370/338 |

FOREIGN PATENT DOCUMENTS

| | | |
|---|---|---|
| CN | 101128982 | 2/2008 |
| CN | 101263688 | 9/2008 |
| WO | WO 2006090254 | 8/2006 |
| WO | WO 2007031554 | 3/2007 |

* cited by examiner

*Primary Examiner* — Afshawn Towfighi
(74) *Attorney, Agent, or Firm* — McClure, Qualey & Rodack, LLP

(57) ABSTRACT

A communication apparatus is provided. A first radio module communicates with a first communications device in compliance with a first protocol to provide a first wireless communications service. A second radio module communicates with a second communications device in compliance with a second protocol to provide a second wireless communications service. The first radio module further estimates time remaining for the second radio module before a next operation of the first radio module and transmits information regarding the estimated remaining time to the second radio module. The second radio module further schedules operations of the second radio module according to the information regarding the estimated remaining time received from the first radio module.

18 Claims, 10 Drawing Sheets

METHODS FOR COORDINATING TRANSMISSION AND RECEPTION OPERATIONS OF RADIO MODULES IN A COMMUNICATIONS APPARATUS AND COMMUNICATION APPARATUSES UTILIZING THE SAME

BACKGROUND OF THE INVENTION

1. Field of the Invention

The invention relates to a method for coordinating the transmission and reception operations of a plurality of radio modules in a communications apparatus, and more particularly to a method coordinating the transmission and reception operations of a plurality of radio modules in a communications apparatus to avoid traffic collision.

2. Description of the Related Art

With the development of wireless communications technology, mobile electronic devices may now be provided with more than one wireless communications service, such as a Bluetooth, Wireless Fidelity (Wi-Fi), which is also called wireless local area network (WLAN), and Worldwide Interoperability for Microwave Access (WiMAX) wireless communications service, and so on. In this regard, overlapping or adjacent operating frequency bands among the different wireless communications services causes transmission performances thereof to degrade. Table 1 below shows the operating frequency band for a WiMAX, WLAN and Bluetooth wireless communications service.

TABLE 1

Category of Wireless Communications Services

| Usage | Wireless Communications service | Frequency band |
|---|---|---|
| Wide Area Network (WAN) | WiMAX | 2.300-2.400 GHz |
| | | 2.496-2.690 GHz |
| | | 3.300-3.800 GHz |
| Local Area Network (LAN) | WLAN | 2.412-2.4835 GHz |
| | | 4.9-5.9 GHz |
| Personal Area Network (PAN) | Bluetooth | 2.402-2.480 GHz |

As shown in Table 1, the frequency bands of WLAN and Bluetooth overlap with each other. In addition, the frequency bands of WLAN and Bluetooth are adjacent to the frequency bands of the WiMAX. When these wireless communications services are integrated in a mobile electronic devices, simultaneous transmission and reception by different wireless communications services may cause transmission interference. For example, the WLAN's frame may be corrupted by the Bluetooth transmission, and the Bluetooth frames may also be affected if the Bluetooth module hops into WLAN's working channels.

Therefore, a method for coordinating the transmission and reception operations of a plurality of radio modules in a communications apparatus is highly required.

BRIEF SUMMARY OF THE INVENTION

Communication apparatuses and methods for coordinating transmission and reception operations of at least a first and a second radio module in a communications apparatus are provided. An embodiment of a communication apparatus comprises a first radio module communicating with a first communications device in compliance with a first protocol to provide a first wireless communications service and a second radio module communicating with a second communications device in compliance with a second protocol to provide a second wireless communications service. The first radio module further estimates time remaining for the second radio module before a next operation of the first radio module and transmits information regarding the estimated remaining time to the second radio module. The second radio module further schedules operations of the second radio module according to the information regarding the estimated remaining time received from the first radio module.

An embodiment of a method for coordinating transmission and reception operations of at least a first and a second radio module in a communications apparatus is provided, wherein the first radio module communicates with a first communications device in compliance with a first protocol to provide a first wireless communications service and the second radio module communicates with a second communications device in compliance with a second protocol to provide a second wireless communications service, comprising: estimating, by the first radio module, time remaining for the second radio module before a next transmitting and/or receiving operation of the first radio module; receiving, by the second radio module, information regarding the estimated remaining time from the first radio module; and scheduling, by the second radio module, operations of the second radio module according to the information regarding the estimated remaining time received from the first radio module.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

Table 1 lists a category of Wireless Communications Services.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
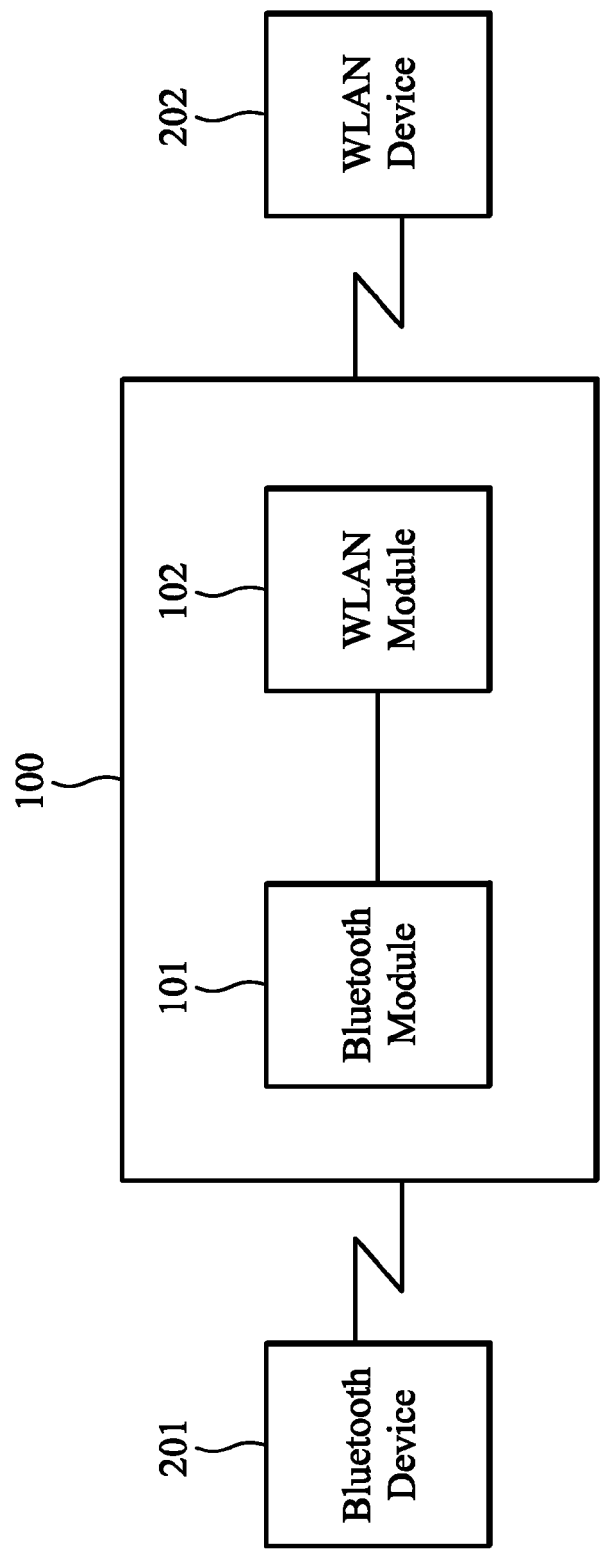
FIG. 1 shows a schematic diagram of a multi-radio communications system according to an embodiment of the invention.
Figure 2:
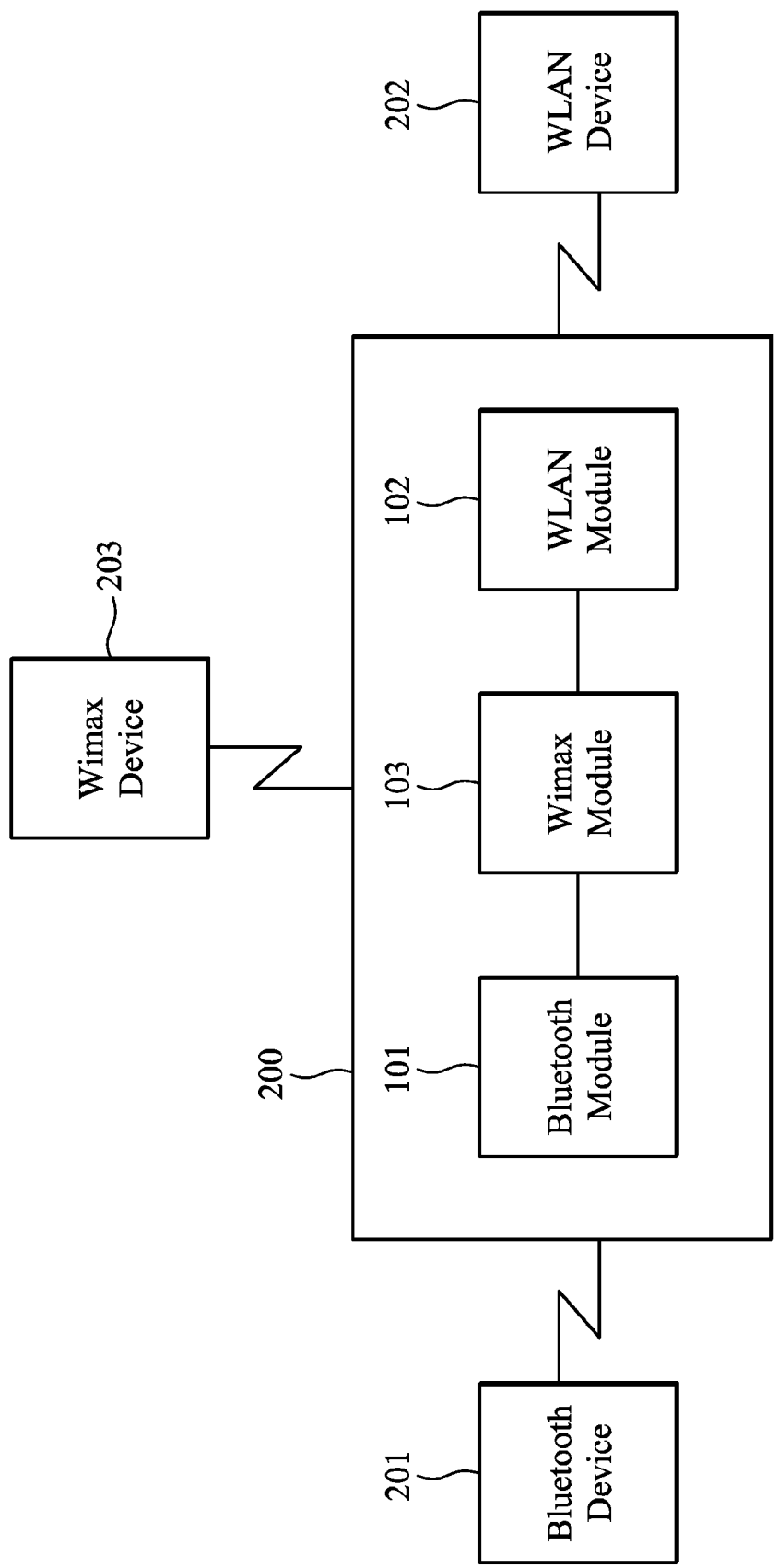
FIG. 2 shows a schematic diagram of a multi-radio communications system according to another embodiment of the invention.

Along with the advancements in wireless communications technology, radio modules providing different wireless communications services may be co-located and coexist in a mobile electronic device. FIG. 1 shows a schematic diagram of a multi-radio communications system according to an embodiment of the invention. The mobile electronic device 100 may comprise a plurality of radio modules providing different wireless communications services. As an example, the mobile electronic device 100 may comprise a Bluetooth module 101 and a WLAN module 102. The Bluetooth module 101 may communicate with a Bluetooth device 201 in compliance with IEEE 802.15 protocol via the air interface. The Bluetooth device 201 may be, as an example, a Bluetooth handset. The WLAN module 102 may communicate with a WLAN device 202 in compliance with IEEE 802.11 protocol via the air interface. The WLAN module 102 may be a Station (STA) and the WLAN device 202 may be, as an example, a WLAN Base Station (BS), Access Point (AP) or Station (STA). FIG. 2 shows a schematic diagram of a multi-radio communications system according to another embodiment of the invention. In the embodiment, the mobile electronic device 200 may further comprise a Wimax module 103 communicating with a Wimax device 203 in compliance with IEEE 802.16 protocol via the air interface. The Wimax device 203 may be, as an example, a Wimax Base Station (BS) or Relay Station (RS). The mobile electronic devices 100 and 200 may be a notebook, a cellular phone, a portable gaming device, a portable multimedia player, a Global Positioning System (GPS), a receiver, or others. According to the embodiments, one antenna may be designed to be shared among the radio modules 101 and 102 or 101, 102 and 103 to improve area efficiency. However, each of the radio modules may also individually comprise an antenna to transceive radio signals and the invention should not be limited thereto. It is also noted that the radio modules 101 and 102 or 101, 102 and 103 may be integrated into an SoC (system on chip) and connected therebetween by internal wires, different but similar bus architectures, or others.

Figure 3:
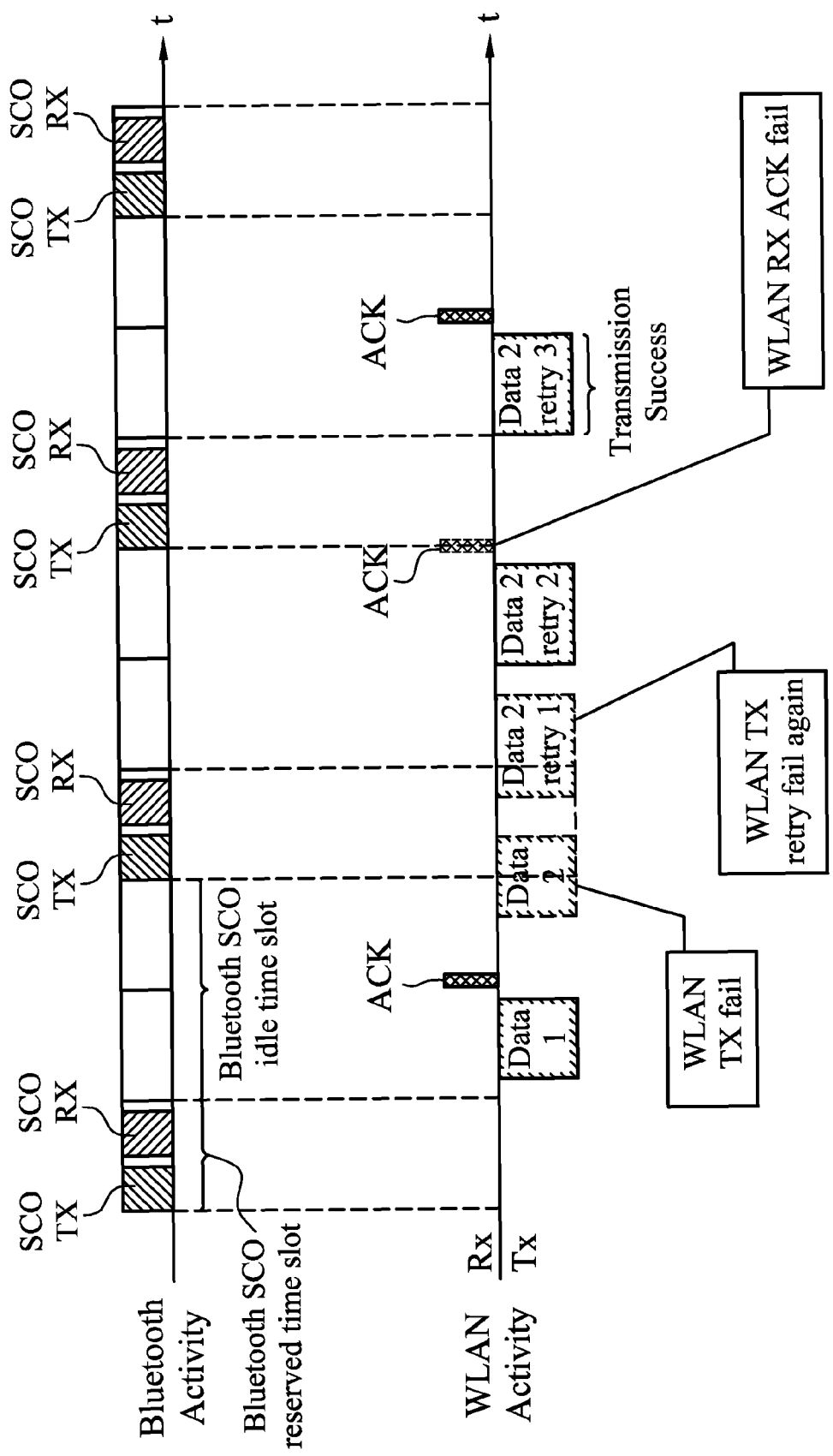
FIG. 3 shows an exemplary time chart of the Bluetooth and WLAN activities when the WLAN module always honors the Bluetooth activity.

When the radio modules are collocated in a small communications apparatus such as the mobile electronic device 100 or 200, a large transmission power, which is normal, for any radio module may saturate sustainable reception power of other adjacent radio modules and cause corresponding receiving operations for the radio module to fail. FIG. 3 shows an exemplary time chart of Bluetooth and WLAN activities when a WLAN module always honors Bluetooth activity. The SCO/eSCO (synchronous connection oriented/extended synchronous connection oriented) link (also called synchronization link) of a Bluetooth is a symmetric, point-to-point link between a master device and a specific slave device. A master device maintains the SCO/eSCO link by using reserved time slots at regular intervals. Because the SCO/eSCO link is usually used for real-time voice transmission, it is preferable for the WLAN module to honor Bluetooth activity so as to avoid packet lost of the Bluetooth transmission; especially when there is only one antenna shared between the WLAN and Bluetooth or WLAN and Bluetooth and Wimax modules. Under this condition, the WLAN module may abort a current transmitting or receiving operation when traffic collision occurs. As shown in FIG. 3, data packet transmission of Data 2 fails because the WLAN transmission (TX) activity collides with Bluetooth SCO TX activity. Therefore, the WLAN module 102 immediately retransmits Data 2. However, the first retransmission retry of Data 2 collides again with the Bluetooth SCO reception (RX) activity. Thus, the WLAN module 102 retransmits Data 2 one more time. The second retransmission retry of the data packet of Data 2 is successfully transmitted, but the acknowledgement (ACK) from the WLAN device 202 (for example, a WLAN AP) is not successfully received (fails) because the WLAN RX activity collides with the Bluetooth SCO TX activity. Finally, a third retransmission retry of Data 2 is successfully transmitted and the ACK from the WLAN AP is also successfully received. However, as shown in FIG. 3, the overall throughput of WLAN module 102 is seriously degraded due to the great amount of data retransmission, and WLAN bandwidth is not efficiently utilized.

Figure 4:
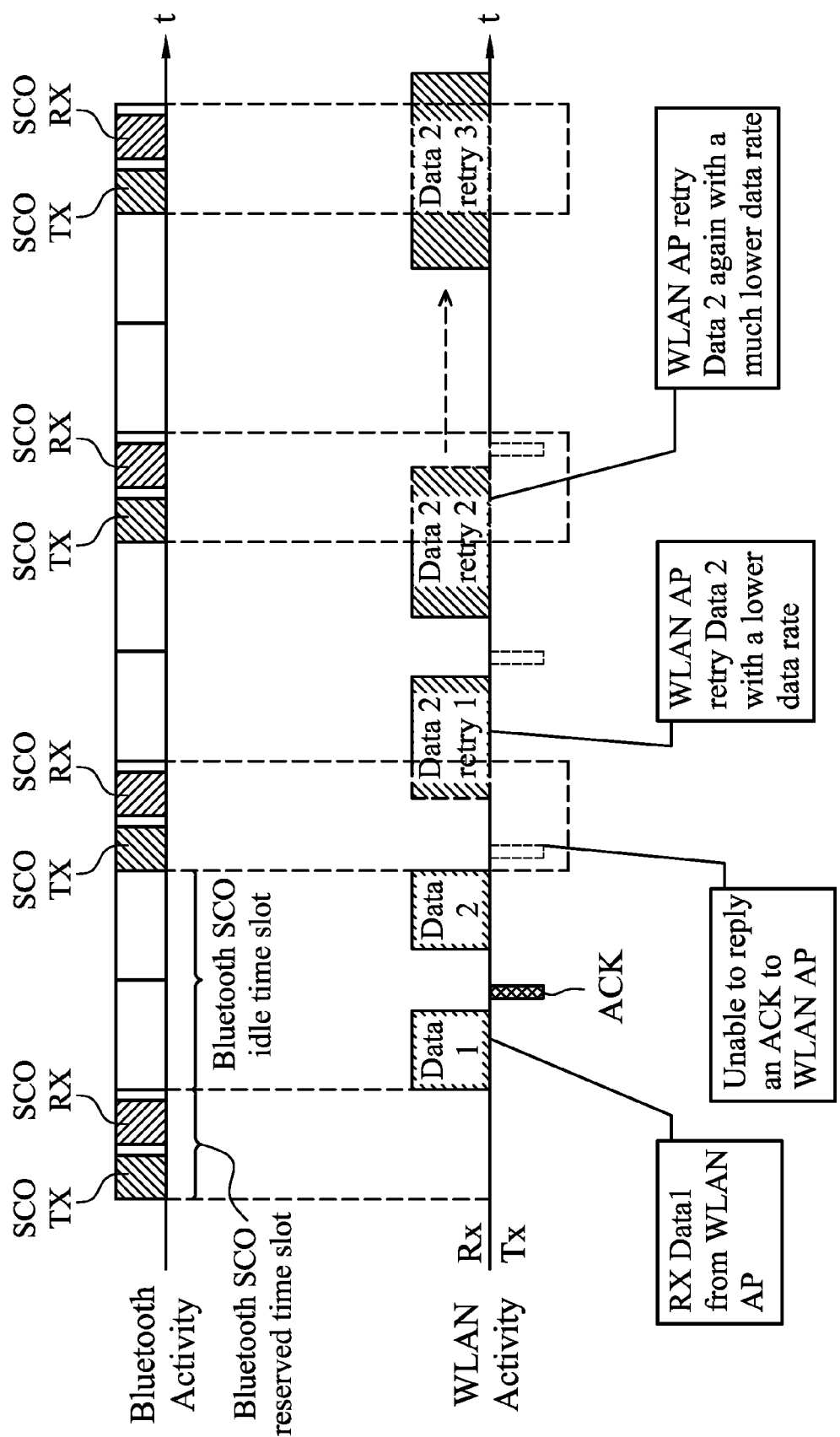
FIG. 4 shows another exemplary time chart of the Bluetooth and WLAN activities when the WLAN module always honors the Bluetooth activity.

FIG. 4 shows another exemplary time chart of the Bluetooth and WLAN activities when the WLAN module always honors the Bluetooth activity. In this application, the WLAN device 202 (for example, a WLAN AP) transmits data packet Data 1 to the WLAN module 102 and receives an ACK therefrom. The WLAN AP next transmits data packet Data 2 to the WLAN module 102, but the WLAN module 102 is unable to reply with an ACK to the WLAN AP due to the SCO TX activity of the Bluetooth module. Next, the WLAN AP uses a lower data rate to retransmit the data packet Data 2, but the retransmission still collides with the SCO RX activity of the Bluetooth module. Next, the WLAN AP uses a much lower data rate to retransmit the data packet Data 2 again. However, as the data rate decreases, the time required for transmitting the data packet increases and the probability of traffic collision also increases. Thus, if the transmission data rate of the WLAN AP decreases to 1 Mbps, probability for failure is almost inevitable. Note that the WLAN AP will disassociate with the WLAN station when all of the retries fail.

Figure 5:
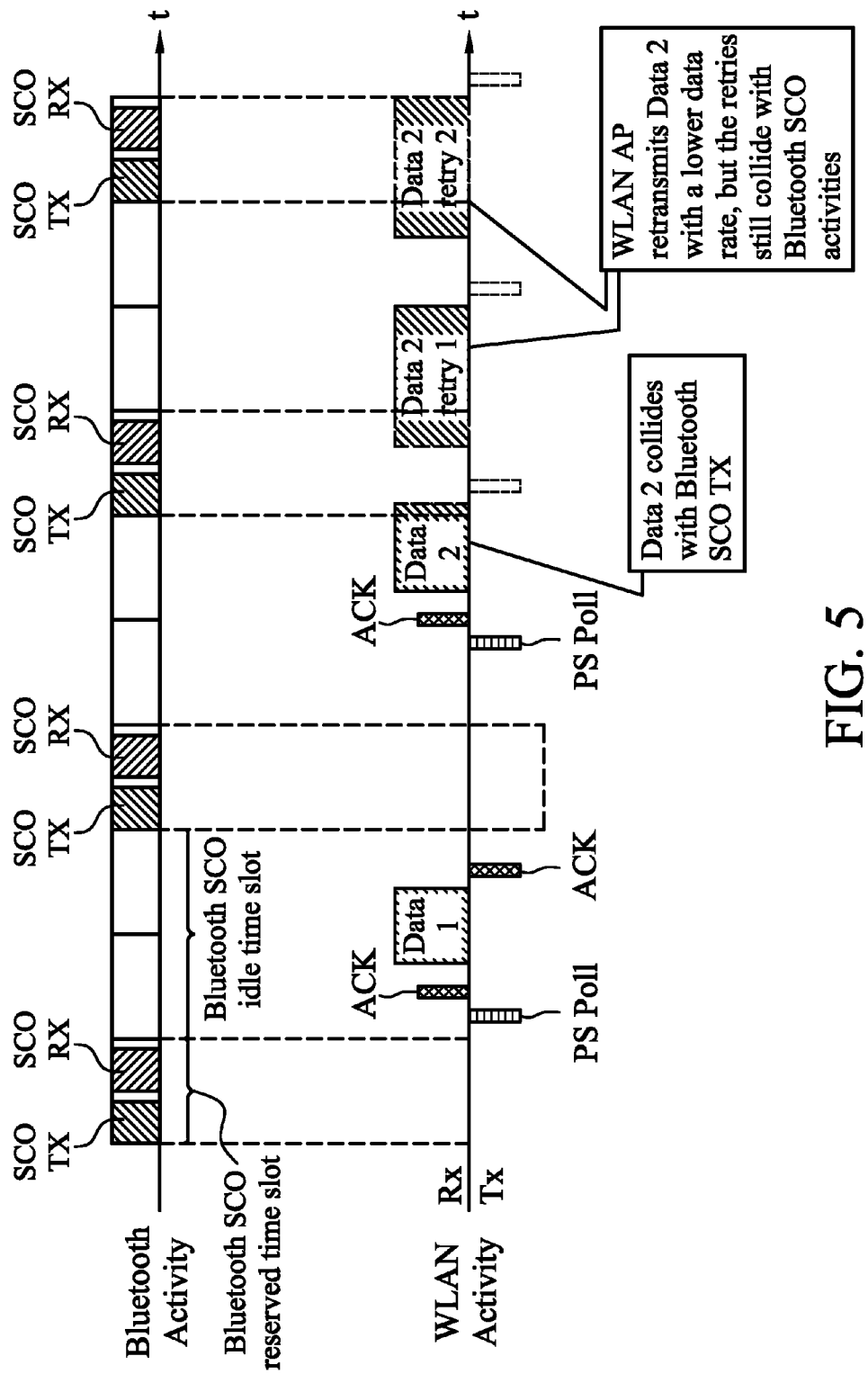
FIG. 5 shows yet another exemplary time chart of the Bluetooth and WLAN activities when the WLAN module always honors the Bluetooth activity.

FIG. 5 shows yet another exemplary time chart of the Bluetooth and WLAN activities when the WLAN module always honors the Bluetooth activity. In this application, the WLAN module 102 enters a power saving (PS) mode to save battery power. Subsequently, the WLAN device 202 (for example, a WLAN AP) may maintain a continually updated record of the WLAN module 102 currently working in the PS mode, and buffer the packets addressed to the WLAN module 102 until the WLAN module 102 specifically requests for the packets by sending a polling request (briefly in PS Poll) to the WLAN AP. As shown in FIG. 5, because the WLAN AP transmits the buffered data packets at an unexpected time after receiving the ACK from WLAN station, it is possible that the transmission of data packets may collide with the Bluetooth SCO activity. In this case, the WLAN AP would retransmit the data packet with a lower data rate. As previously discussed, this trend is not desired as the probability of traffic collision increases when data rate decreases. Therefore, as shown in FIG. 3 to FIG. 5, the overall throughput of a WLAN module 102 may be seriously degraded due to the repeated data retransmission, and the WLAN bandwidth would be inefficiently utilized.

According to an embodiment of the invention, in order to avoid traffic collision between different radio modules, information regarding a remaining window may be transmitted in advance between different radio modules so that TX or RX traffic may be properly scheduled according to the remaining window. The information regarding a remaining window may be carried in a data packet and transmitted between different radio modules. As an example, the Bluetooth module 101 may estimate time remaining for the WLAN module 102 before a next transmitting or receiving operation of the Bluetooth module 101 and transmit information regarding the estimated remaining time (i.e. the remaining window) to the WLAN module 102. After receiving the information regarding time remaining for a remaining window which the WLAN module 102 can process, the WLAN module 102 may schedule corresponding transmitting or receiving operations according to the remaining window. In order to clearly and briefly introduce the concept of using a remaining window, the WLAN module 102 and the Bluetooth module 101 will be taken as exemplary radio modules in the following paragraphs. However, it is noted that the concept of using a remaining window may also be applied to the Wimax module 103 as shown in FIG. 2 and the invention should not be limited thereto. As an example, the Bluetooth module 101 may estimate time remaining for the WLAN module 102 and the Wimax module 103, or the Wimax module 103 may estimate time remaining for the WLAN module 102 and the Bluetooth module 101, and transmit information regarding the estimated remaining time therebetween.

Figure 6:
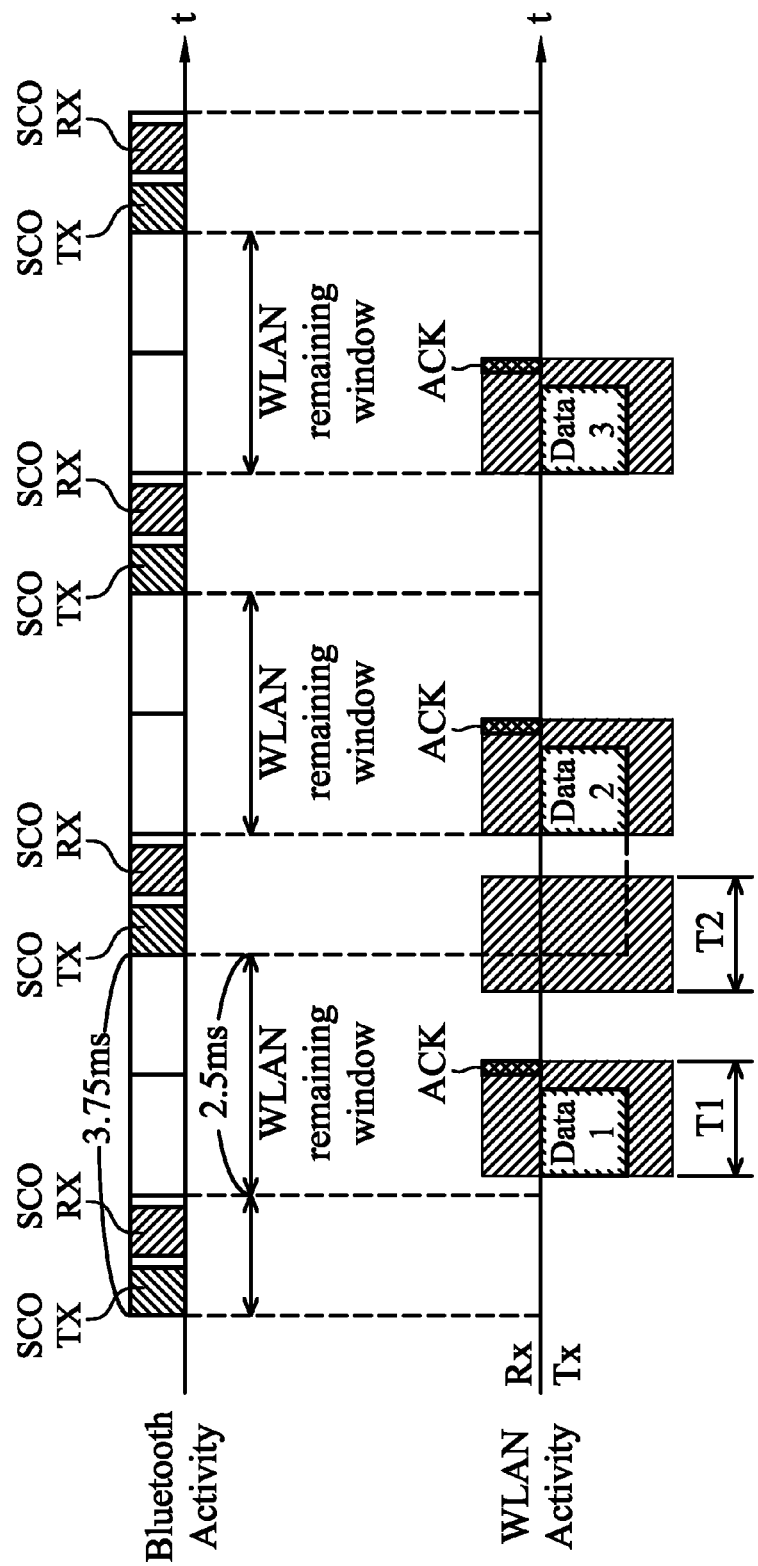
FIG. 6 shows an exemplary time chart of the Bluetooth and WLAN activities using a remaining window according to an embodiment of the invention.

FIG. 6 shows an exemplary time chart of the Bluetooth and WLAN activities the remaining window according to an embodiment of the invention. When finishing a TX or RX activity, the Bluetooth module 101 may estimate time remaining for the WLAN module 102 before a next transmitting or receiving operation of the Bluetooth module 101 and transmit information regarding the estimated remaining time (i.e. the remaining window) to the WLAN module 102. As an example, when time between the periodic SCO link time slots is 3.75 ms and the SCO TX and RX time slot takes about 1.25 ms, the Bluetooth module 101 may estimate time remaining for the WLAN module 102 before a next periodic Bluetooth SCO TX operation is 2.5 ms (3.75−1.25) and transmit information regarding a remaining window to the WLAN module 102. After receiving the information regarding the 2.5 ms remaining window which the WLAN module 102 can process, the WLAN module 102 may first determine whether the time T1 required for the corresponding TX and/or RX operation exceeds the remaining window. When the time T1 required for the corresponding TX and/or RX operation does not exceed the remaining window, the WLAN module 102 may schedule the corresponding TX and/or RX operation within the remaining window. As shown in FIG. 6, the data packet Data 1 is arranged to be transmitted within the remaining window and the ACK from WLAN AP is also successfully received. On the other hand, when the WLAN module 102 determines that the time T2 required for the TX and/or RX operation exceeds the remaining window, the WLAN module 102 does not schedule the corresponding TX and/or RX operation within the remaining window and may wait for another available remaining window. Note that because the Bluetooth is guaranteed not to have higher priority TX and/or RX activities within the remaining window, the WLAN module 102 is free to use this time period, while preventing undesired traffic collisions. Note also that according to an embodiment of the invention, the WLAN module 102 may comprise a counter to count down a counter value initially set to the received estimated remaining time (e.g. 2.5 ms), and determine whether the time required for the corresponding TX and/or RX operation exceeds the remaining window according to the counter value every time the TX and/or RX operation is scheduled. Note that before receiving information regarding time remaining for a remaining window, the counter value may always be set to zero, meaning that there is no TX and/or RX window that the WLAN module 102 can use. After receiving information regarding a remaining window, the counter value may be set to the estimated remaining time and the counter begins to count down the counter value until the counter value reaches zero.

Figure 7:
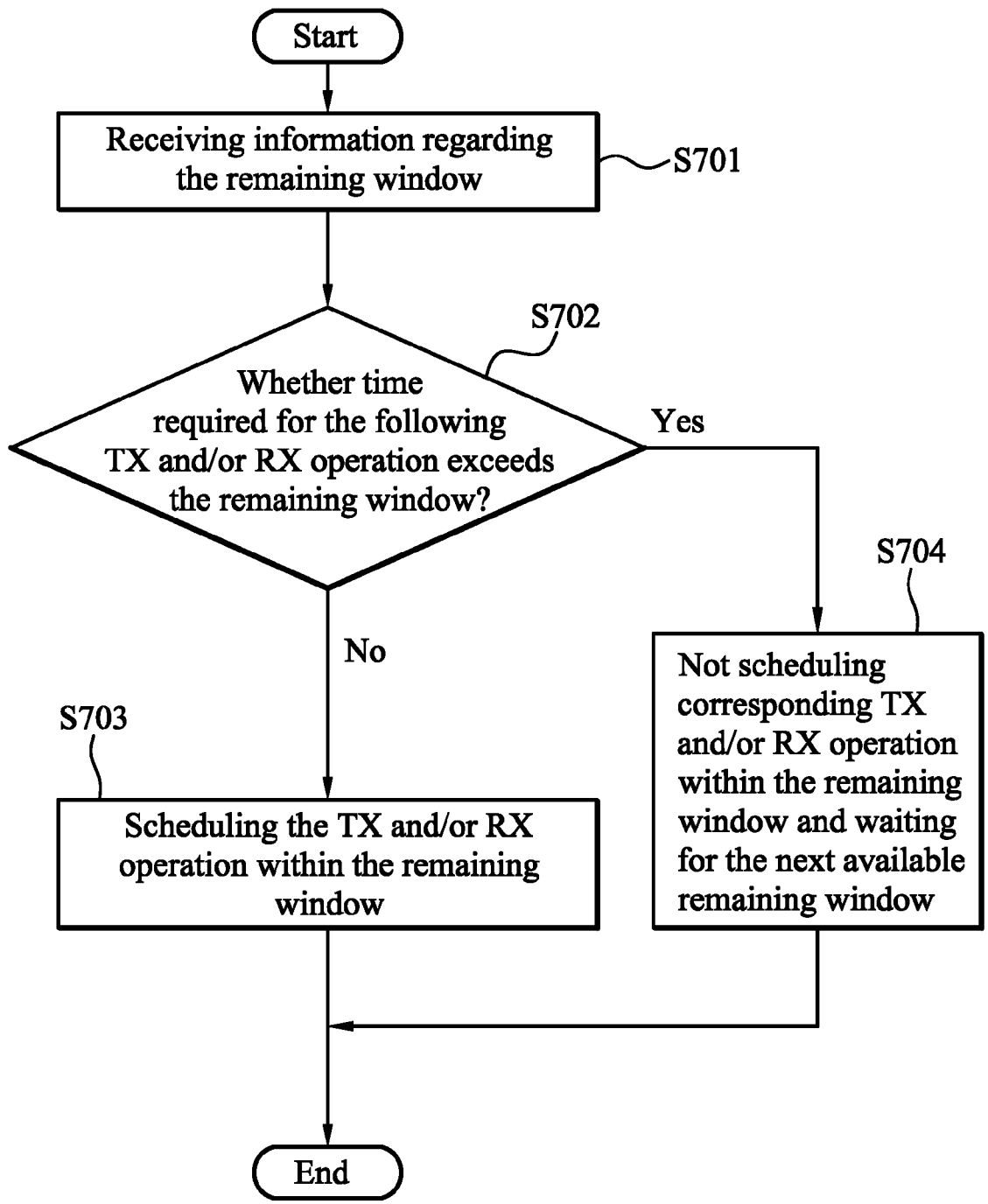
FIG. 7 shows a flow chart of a method for coordinating the transmission and reception operations of a plurality of radio modules in a communications apparatus according to an embodiment of the invention.

FIG. 7 shows a flow chart of a method for coordinating the transmission and reception operations of a plurality of radio modules in a communications apparatus according to an embodiment of the invention. After receiving the information regarding the remaining window from the Bluetooth module 101 (Step S701), the WLAN module 102 determines whether the time required for the following TX and/or RX operation exceeds the remaining window (Step S702). When the time required for the following TX and/or RX operation does not exceed the remaining window, the WLAN module 102 may schedule the TX and/or RX operation within the remaining window (Step S703). When the time required for the following TX and/or RX operation exceeds the remaining window, the WLAN module 102 does not schedule a corresponding TX and/or RX operation within the remaining window and waits for the next available remaining window provided by the Bluetooth module 101 (Step S704).

Figure 8:
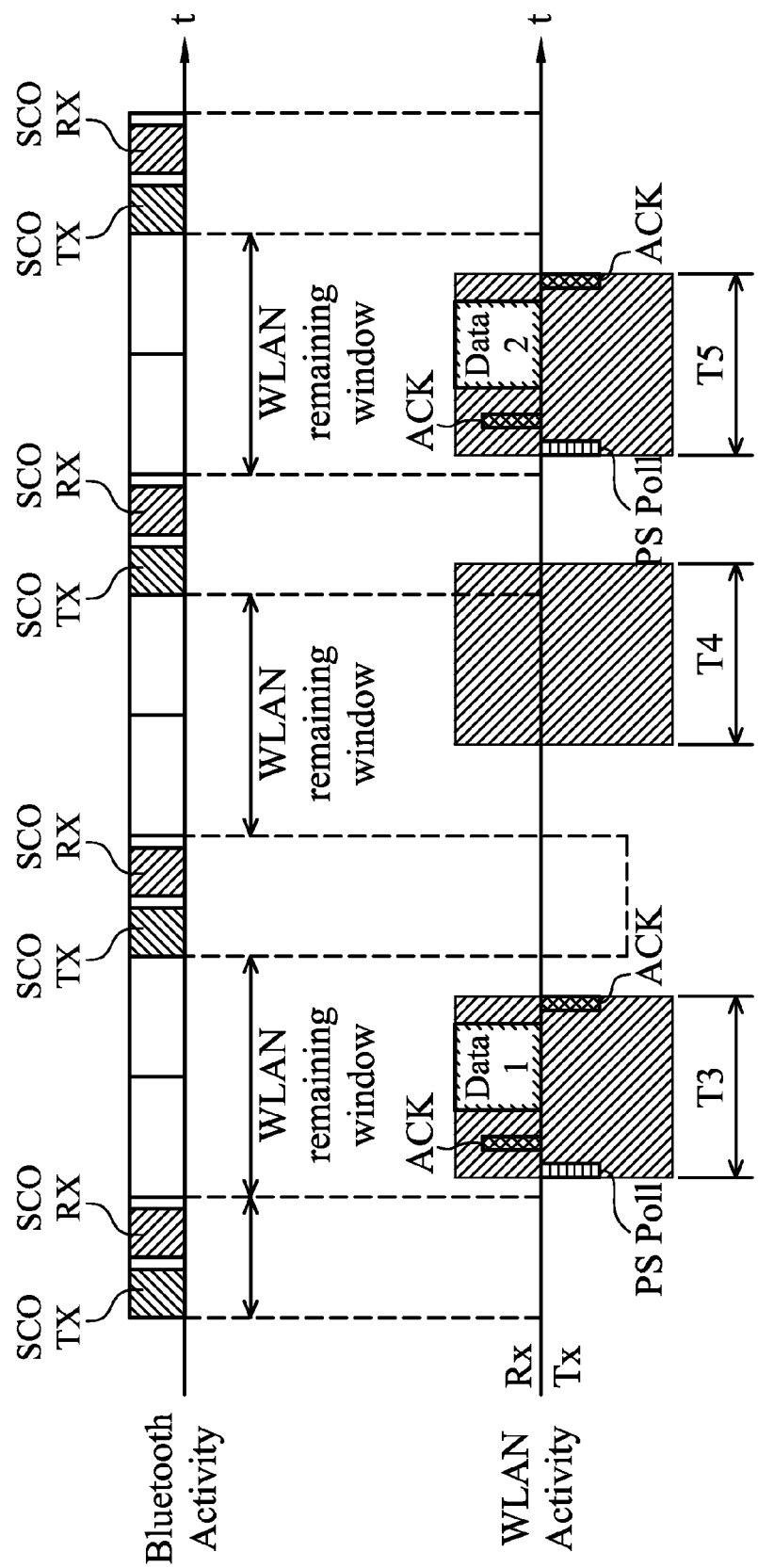
FIG. 8 shows another exemplary time chart of the Bluetooth and WLAN activities using a remaining window according to an embodiment of the invention.

FIG. 8 shows another exemplary time chart of the Bluetooth and WLAN activities using a remaining window according to an embodiment of the invention. According to the embodiments of the invention, the remaining window may also be applied when the WLAN module 102 has entered a power saving (PS) mode to save battery power. After receiving the information regarding the remaining window (e.g. 2.5 ms) which the WLAN module 102 can process, the WLAN module 102 may first estimate the expected PS Poll data exchange time under power saving mode and determine whether the expected PS Poll data exchange time exceeds the remaining window. As shown in FIG. 8, when the first expected PS Poll data exchange time T3 does not exceed the remaining window, the WLAN module 102 may begin to transmit the PS Poll request to the WLAN AP and wait for the buffered data. On the other hand, when the WLAN module 102 determines that the expected PS Poll data exchange time T4 exceeds the remaining window, the WLAN module 102 may not transmit the PS Poll request to the WLAN AP and may wait for another available remaining window.

Figure 9:
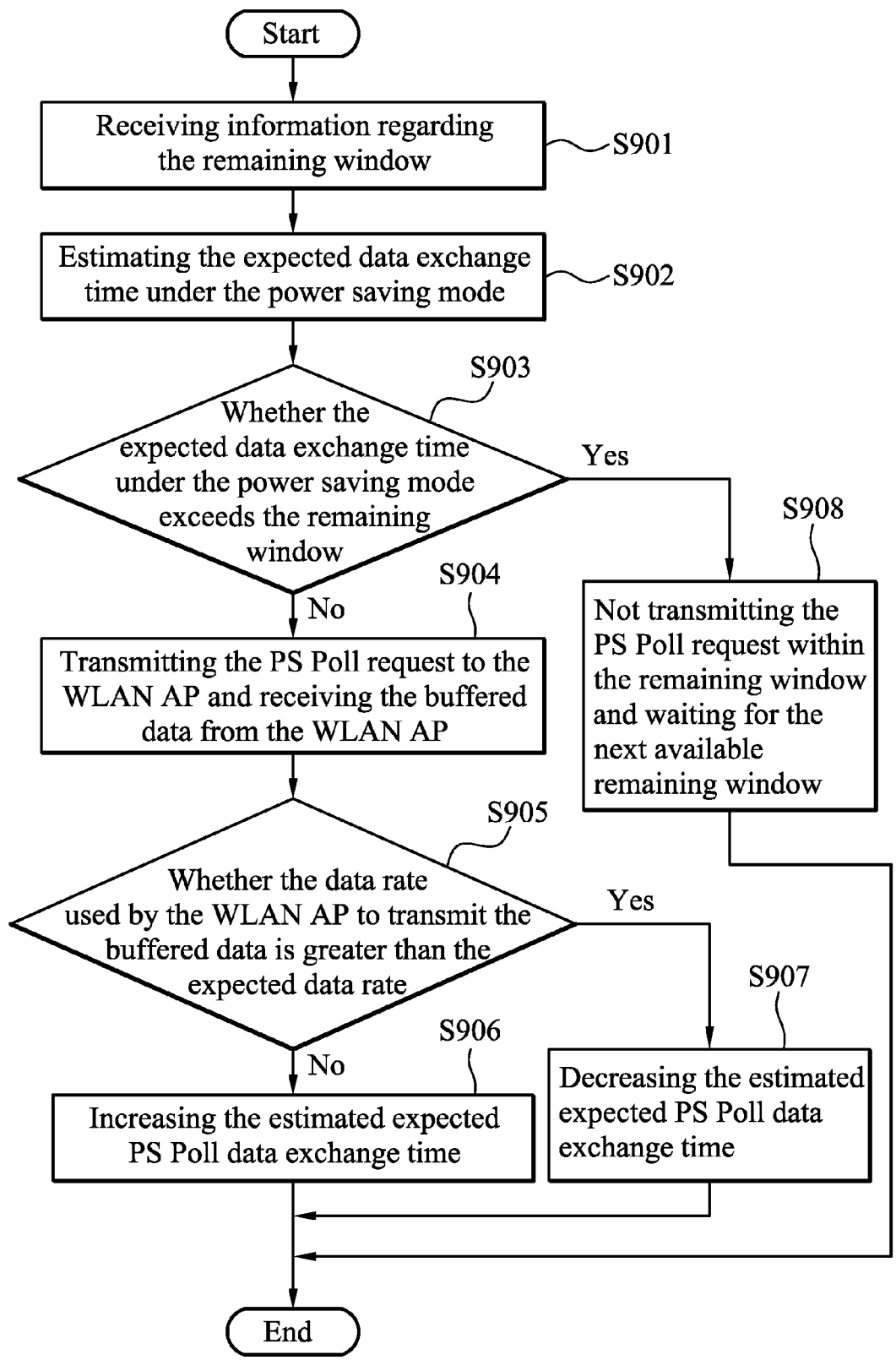
FIG. 9 shows another flow chart of a method for coordinating the transmission and reception operations of a plurality of radio modules in a communications apparatus according to another embodiment of the invention.

FIG. 9 shows another flow chart of a method for coordinating the transmission and reception operations of a plurality of radio modules in a communications apparatus according to another embodiment of the invention. After receiving the information regarding the remaining window from the Bluetooth module 101 (Step S901), the WLAN module 102 in a power saving mode may estimate the expected data exchange time under the power saving mode (Step S902) and determine whether the expected data exchange time under the power saving mode exceeds the remaining window (Step S903). Note that according to some embodiments of the invention, the expected data exchange time under the power saving mode may be expected unscheduled automatic power saving delivery (UAPSD) data exchange time or expected PS Poll data exchange time. For clarity, the present invention takes PS Poll data as exemplary embodiment for illustration purpose. In addition, the PS Poll data exchange time may be from the time of the PS Poll request is transmitted till the time when ACK for acknowledging the reception of the buffered data is transmitted or may be first estimated according to a previous PS Poll data exchange time. When the expected data exchange time under the power saving mode does not exceed the remaining window, the WLAN module 102 may begin to transmit the PS Poll request to the WLAN AP and receive the buffered data from the WLAN AP (Step S904). According to the embodiment of the invention, after receiving the buffered data from the WLAN AP, the WLAN module 102 may further check whether the data rate used by the WLAN AP to transmit the buffered data is greater than the expected data rate (Step S905). In some embodiments of the invention, the expected data rate may be directly chosen as the data rate used by the WLAN AP in response to a previous PS Poll request. According to other embodiments of the invention, the expected data rate may also be estimated according to the received transmission power of the Beacon frames periodically sent by the WLAN AP. When the transmission power is obtained, the distance to the WLAN AP may be accordingly estimated, so as to estimate a suitable data rate as the expected data rate. When the data rate used by the WLAN AP to transmit the buffered data is not greater than the expected data rate, the WLAN module 102 may increase the estimated expected PS Poll data exchange time according to the data rate and the amount of buffered data (Step S906). When the data rate used by the WLAN AP to transmit the buffered data is greater than the expected data rate, the WLAN module 102 may decrease the estimated expected PS Poll data exchange time according to the data rate and the amount of buffered data (Step S907). The corrected expected PS Poll data exchange time may be used for a next time estimation procedure for a next available remaining window. On the other hand, when the expected PS Poll data exchange time exceeds the remaining window, the WLAN module 102 may not transmit the PS Poll request within the remaining window and wait for the next available remaining window (Step S908).

Figure 10:
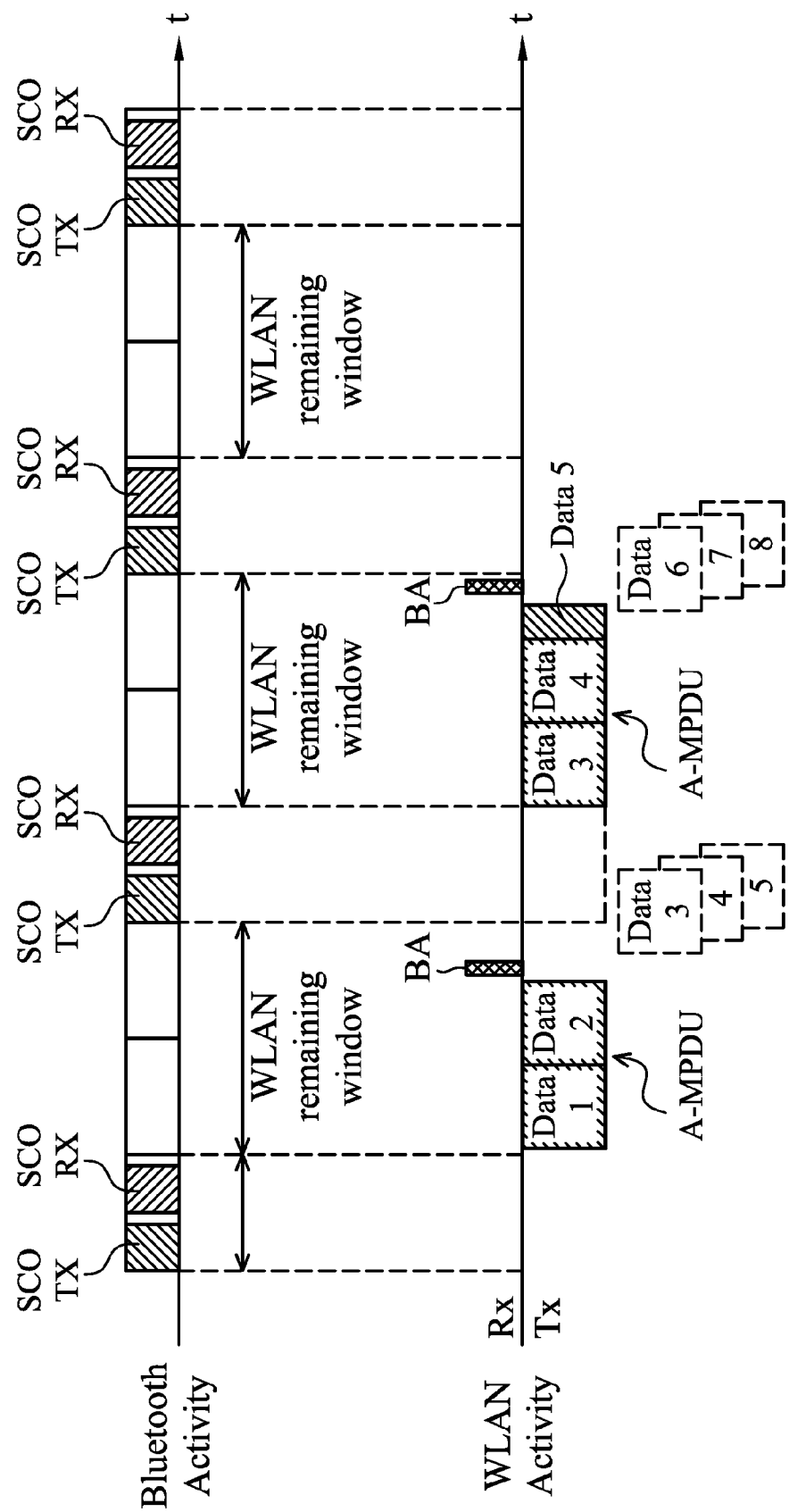
FIG. 10 shows another exemplary time chart of the Bluetooth and WLAN activities using a remaining window according to an embodiment of the invention.

FIG. 10 shows another exemplary time chart of the Bluetooth and WLAN activities using a remaining window according to an embodiment of the invention. According to the embodiment of the invention, the concept of transmitting information regarding the remaining window between different radio modules may also be applied to IEEE 802.11n with Aggregated MAC Protocol Data Unit (A-MPDU). With the knowledge of remaining window provided by the Bluetooth module 101, the WLAN module 102 may aggregate a maximum amount of TX data packets to increase transmission data throughput. As shown in FIG. 10, the WLAN module 102 may determine that at most two data packet transmissions and a block acknowledgement (BA) reception may be performed within the first WLAN remaining window. Therefore, the WLAN module 102 may aggregate and transmit two data packets (Data 1 and Data 2) within the first WLAN remaining window. Next, after receiving information regarding the second remaining window, the WLAN module 102 may determine that at most three data packet transmissions and a BA reception may be performed within the second WLAN remaining window. Therefore, the WLAN module 102 may aggregate and transmit the next three data packets (Data 3, Data 4 and Data 5) within the second WLAN remaining window. Therefore, based on the information regarding the remaining window (i.e. the remaining time that the WLAN module 102 can use), the A-MPDU may be implemented more efficiently so as to further increase data throughput thereof.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
a first radio module communicating with a first communications device in compliance with a first protocol to provide a first wireless communications service, wherein the first radio module further estimates time remaining for a second radio module before a next operation of the first radio module and transmits information regarding the estimated remaining time to the second radio module;
the second radio module communicating with a second communications device in compliance with a second protocol to provide a second wireless communications service, wherein the second radio module further schedules operations of the second radio module according to the received information regarding the estimated remaining time;
wherein when the second radio module enters into a power saving (PS) mode, the second radio module estimates expected data exchange time under the power saving mode according to an expected data rate used by the second communications device to transmit data to the second radio module after receiving the information regarding the estimated remaining time from the first radio module, and
wherein when the expected data exchange time under the power saving mode does not exceed the estimated remaining time, the second radio module transmits a PS Poll request to the second communications device.

2. The communication apparatus as claimed in claim 1, wherein after receiving information regarding the estimated remaining time from the first radio module, the second radio module determines whether time required for the operations of the second radio module exceeds the estimated remaining time, and schedules the operations of the second radio module when the time required for operations of the second radio module does not exceed the estimated remaining time.

3. The communication apparatus as claimed in claim 2, wherein the second radio module does not schedule the operations of the second radio module and waits for information regarding another estimated remaining time from the first radio module when the time required for the operations of the second radio module exceeds the estimated remaining time.

4. The communication apparatus as claimed in claim 1, wherein the second radio module comprises a counter to determine whether time required for the operations of the second radio module exceeds the estimated remaining time according to a counter value.

5. The communication apparatus as claimed in claim 1, wherein when the expected data exchange time under the power saving mode exceeds the estimated remaining time, the second radio module does not transmit the PS Poll request and waits for information regarding another estimated remaining time from the first radio module.

6. The communication apparatus as claimed in claim 5, wherein after receiving the buffered data from the second communications device, the second radio module further checks whether a data rate used by the second communications device to transmit the buffered data is greater than the expected data rate, and increases the estimated expected data exchange time under the power saving mode when the data rate used by the second communications device to transmit the buffered data is not greater than the expected data rate.

7. The communication apparatus as claimed in claim 6, wherein the second radio module further decreases the estimated expected data exchange time under the power saving mode when the data rate used by the second communications device to transmit the buffered data is greater than the expected data rate.

8. The communication apparatus as claimed in claim 1, wherein after receiving the information regarding the estimated remaining time from the first radio module, the second radio module determines how many data packets at most can be successfully transmitted within the estimated remaining time, aggregates the data packets and transmits the aggregated data packets within the estimated remaining time.

9. The communication apparatus as claimed in claim 1, wherein the first and the second radio modules are integrated into a system on chip (SOC) and connected to each other.

10. The communication apparatus as claimed in claim 1, further comprising:
an antenna module shared among the first and the second radio modules.

11. A method for coordinating transmission and reception operations of at least a first and a second radio module in a communications apparatus, the first radio module communicating with a first communications device in compliance with a first protocol to provide a first wireless communications service and the second radio module communicating with a second communications device in compliance with a second protocol to provide a second wireless communications service, comprising:
estimating, by the first radio module, time remaining for the second radio module before a next transmitting and/or receiving operation of the first radio module;
receiving, by the second radio module, information regarding the estimated remaining time from the first radio module; and
scheduling, by the second radio module, operations of the second radio module according to the information regarding the estimated remaining time received from the first radio module,
wherein the scheduling step further comprises estimating expected data exchange time under a power saving (PS) mode according to an expected data rate used by the second communications device to transmit data to the second radio module after receiving the information regarding the estimated remaining time from the first radio module when the second radio module enters into the power saving mode, and
wherein when the expected data exchange time under the power saving mode does not exceed the estimated remaining time, the method further comprises transmitting, by the second radio module, a PS Poll request to the second communications device.

12. The method as claimed in claim 11, further comprising:
determining whether time required for the operations of the second radio module exceeds the estimated remaining time; and
scheduling the operations of the second radio module when the time required for the operations of the second radio module does not exceed the estimated remaining time.

13. The method as claimed in claim 12, further comprising:
not scheduling the operations of the second radio module and waiting for information regarding another estimated remaining time from the first radio module when the time required for the operations of the second radio module exceeds the estimated remaining time.

14. The method as claimed in claim 11, further comprising:
setting a counter value to the estimated remaining time after receiving the information regarding the estimated remaining time from the first radio module; and
down counting the counter value until the counter value becomes zero.

15. The method as claimed in claim 11, further comprising:
not transmitting the PS Poll request and waiting for information regarding another estimated remaining time from the first radio module when the expected data exchange time under the power saving mode exceeds the estimated remaining time.

16. The method as claimed in claim 15, further comprising:
checking whether a data rate used by the second communications device to transmit the buffered data is greater than the expected data rate after receiving the buffered data from the second communications device; and
increasing the estimated expected data exchange time under the power saving mode when the data rate used by the second communications device to transmit the buffered data is not greater than the expected data rate.

17. The method as claimed in claim 15, further comprising:
decreasing the estimated expected data exchange time under the power saving mode when the data rate used by the second communications device to transmit the buffered data is greater than the expected data rate.

18. The method as claimed in claim 11, further comprising:
determining how many data packets at most can be successfully transmitted within the estimated remaining time after receiving the information regarding the estimated remaining time;
aggregating the data packets; and
transmitting the aggregated data packets within the estimated remaining time.

* * * * *